US006963751B1

(12) United States Patent
Kordsmeyer et al.

(10) Patent No.: US 6,963,751 B1

(45) Date of Patent: Nov. 8, 2005

(54) METHOD FOR TRANSMITTING SERVICE DATA IN TELECOMMUNICATION SYSTEMS WITH WIRELESS TELECOMMUNICATION BASED ON A PREDEFINED RADIO INTERFACE PROTOCOL BETWEEN TELECOMMUNICATION DEVICES, ESPECIALLY VOICE DATA AND/OR PACKET DATA IN DECT SYSTEMS

(75) Inventors: Martin Kordsmeyer, Hörstel (DE); Anton Kruk, Erkrath (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/674,797

(22) PCT Filed: May 6, 1999

(86) PCT No.: PCT/DE99/01370

§ 371 (c)(1), (2), (4) Date: Nov. 6, 2000

(87) PCT Pub. No.: WO99/57848

PCT Pub. Date: Nov. 11, 1999

(30) Foreign Application Priority Data

May 6, 1998 (DE) ........................................ 198 20 233

(51) Int. Cl.[7] .................................................. H04Q 7/20

(52) U.S. Cl. .................... 455/466; 455/450; 455/426.1; 455/550; 370/524

(58) Field of Search ............................. 455/450, 550.1, 455/426.1; 370/524, 474, 338

(56) References Cited

U.S. PATENT DOCUMENTS 5,606,552 A * 2/1997 Baldwin et al. ............ 370/474
6,539,033 B1 * 3/2003 Kamperschroer et al. ... 370/524

FOREIGN PATENT DOCUMENTS

| | | | |
|---|---|---|---|
| DE | 196 36 744 | | 3/1998 |
| EP | 0 708 576 | | 4/1996 |
| GB | 2 168 573 | | 6/1986 |
| GB | 2 315 964 | | 2/1998 |
| WO | WO 91/15070 | | 10/1991 |
| WO | WO 93/21719 | | 10/1993 |
| WO | WO 96/38991 | | 12/1996 |
| WO | WO 9811759 | * | 3/1998 |

OTHER PUBLICATIONS

DECT/GAP standard (Digital European Cordless Telecommunication; cf. (1): Nachrichtentechnik Elektronik 42 (1992) Jan./Feb. No. 1, Berlin, DE; U. Pilger "Struktur des DECT–Standards," pp. 23–29.

(Continued)

*Primary Examiner*—David Hudspeth
*Assistant Examiner*—S. Smith
(74) *Attorney, Agent, or Firm*—Bell, Boyd & Lloyd LLC

(57) ABSTRACT

To transmit service data in telecommunication systems with wireless telecommunication based on a predefined radio interface protocol between telecommunication devices, especially voice data and/or packet data in DECT systems, with enhanced utilization of the bandwith of the telecommunication system and at a greater transmission rate, service data units to be transmitted are transported by radio cascaded (a cascade arrangement) in protocol data units adapted to the radio interface protocol. The protocol data units in each case contain as many information fields; configured especially as length indicators for specifying the respective service data length; as there are service data units or fragments of service data units contained in the respective protocol data unit. In addition, each information field contains an extension (a reference) in the form of a concatenated list whether further service data units or further fragments of service data units follow in the respective protocol data unit.

6 Claims, 2 Drawing Sheets

OTHER PUBLICATIONS

ETSI—Publication, Oct. 1992, ETS 300175 1 . . . 9, Part 1: Overview, pp. 1–30; Part 2: Physical layer, pp. 1–39; Part 3: Medium access control layer, pp. 1–197; Part 4: Data link control layer, pp. 1–128; Part 5: Network layer, pp. 1–241; Part 6: Identities and addressing, pp. 1–41; Part 7: Security features, pp. 1–104; Part 8: Speech coding and transmission, pp. 1–39; Part 9: Public access profile, pp. 1–71.

Unterrichtsblätter—Deutsche Telekom Jg. 48, Feb. 1995, Protokolle am Beispiel des OSI–Referenzmodells, pp. 102–111.

IEEE Communications Magazine, Jan. 1995, D. Falconer et al., "Time Division Multiple Access Methods for Wireless Personal Communications", pp. 50–57.

Publikation: Vortrag von A. Elberse, et al., "DECT Data Services",—DECT in Fixed Mobile Networks, Jun. 1996, pp. 1–12.

Components 31, (1993), Stephan Althammer et al, "Hochoptimierte Ics für DECT–Schnurlos–telefone", pp. 215–218.

Unterrichtsblätter—Deutsche Telekom, JG.

* cited by examiner

METHOD FOR TRANSMITTING SERVICE DATA IN TELECOMMUNICATION SYSTEMS WITH WIRELESS TELECOMMUNICATION BASED ON A PREDEFINED RADIO INTERFACE PROTOCOL BETWEEN TELECOMMUNICATION DEVICES, ESPECIALLY VOICE DATA AND/OR PACKET DATA IN DECT SYSTEMS

BACKGROUND OF THE INVENTION

1. Field of the Invention

The invention relates to a method for transmitting service data in telecommunication systems with wireless telecommunication based on a predefined radio interface protocol between telecommunication devices, especially voice data and/or packet data in DECT systems 2. Description of the Related Art In communication systems comprising a message transmission link between a message source and a message sink, transmitting and receiving devices are used for message processing and transmission. In these devices;

1) the message processing and message transmission can take place in a preferred direction of transmission (simplex operation) or in both directions of transmission (duplex operation),
2) the message processing is analog or digital,
3) the message transmission takes place via a long-distance link wirelessly on the basis of various message transmission methods such as FDMA (Frequency Division Multiple Access), TDMA (Time Division Multiple Access) and/or CDMA (Code Division Multiple Access)—e.g., in accordance with radio standards such as DECT, GSM, WACS or PACS, IS-54, 1S-95, PHS, PDC etc. [cf. IEEE Communications Magazine, January 1995, pages 50 to 57; D. D. Falconer et al: "Time Division Multiple Access Methods for Wireless Personal Communications"] and/or on wires.

"Message" is a generic term which stands both for the meaning (information) and for the physical representation (signal). In spite of the same meaning of a message (i.e, the same information) different signal forms can occur. Thus, for example, a message relating to an object can be transmitted;

(1) in the form of an image,
(2) as a spoken word,
(3) as a written word,
(4) as an encrypted word or image.

In this context, the type of transmission according to (1) through (3) is normally characterized by continuous (analog) signals whereas in the type of transmission according to (4), discontinuous signals (e.g. pulses and digital signals) are usually produced.

On the basis of this general definition of a communication system, the invention relates to a method for transmitting service data in telecommunication systems with wireless telecommunication based on a predefined radio interface protocol between telecommunication devices, especially voice data and/or packet data in DECT systems.

The wireless transmission of service data—e.g., the transmitting and receiving of, for example, voice data and/or packet data over the radio path over relatively large distances—between telecommunication devices, which are spatially separate from one another, are constructed as data sources and data sinks. These can be connected by wireless telecommunication, of a telecommunication system or a telecommunication network (which the scenario for the long-distance transmission of service data) and can take place with the aid of DECT (digital enhanced cordless telecommunication) technology, e.g., according to the publication "Vortrag von A. Elberse, M. Barry, G. Fleming zum Thema: (lecture by A. Elberse, M. Barry, G. Fleming on the subject): "*DECT Data Services—DECT in Fixed and Mobile Networks*", Jun. 17/18, 1996, Hotel Sofitel, Paris; pages 1 to 12 and summary" in conjunction with the printed documents (1) "*Nachrichtentechnik Elektronik* 42" (1992) January/February No. 1, Berlin, DE; U. Pilger "*Struktur des DECT-Standards*" (structure of the DECT standard), pages 23 to 29; (2) ETSI publication ETS 300175-1 . . . 9, October 1992; (3) Components 31 (1993), Vol. 6, pages 215 to 218; S. Althamrner, D. Brückmann: "Hochoptimierte IC's für DECT-Schnurlostelefone" (highly optimized ICs for DECT cordless telephones); (4) WO 96/38991 (cf. FIGS. 5 and 6 and the respective associated description); (5) Training sheets—Deutsche Telecom, Vol. 48, February 1995, pages 102 to 111; (6): WO 93/21719 (FIG. 1 to 3 and the associated description).

The DECT standard describes a radio access technology for wireless telecommunication in the frequency band from 1880 MHz to 1900 MHz with GFSK (Gaussian frequency shift keying) modulation and a Gaussian filter characteristic of BT=0.5. The DECT technology enables any telecommunication network to be accessed. In addition, the DECT technology supports a multiplicity of different applications and services. The DECT applications comprise, e.g., telecommunication in the home (residential cordless telecommunication), accesses to the public PSTN, ISDN, GSM and/or LAN network, the WLL (wireless local loop) scenario and the CTM (cordless terminal mobility) scenario. The telecommunication services supported are e.g. voice, fax, modem, E-mail, Internet, X.25 services etc.

The DECT standard provides various methods for transmitting service data, especially the protected transmission of voice data and/or packet data (cf. ETSI publication ETS 300175-4, September 1996, chapter 12). It is necessary to divide the service data to be transmitted into data units or data packets which are suitable for transmission (protocol data unit PDU). The protocol data units are adapted to the DECT radio interface protocol, especially to the DECT-related TDMA structure and to the various types of transmission for transmitting service data (cf. ETSI publication ETS 300175-4, September 1996, chapter 12, especially tables 21 to 26). For dividing the service data into the protocol data units, the DECT standard also contains a segmenting mechanism or segmenting procedure, respectively, which allows only a single service data unit (SDU) or possibly only a single fragment of a service data unit to be transmittable in each protocol data unit.

FIG. 1 shows in a basic representation, not true to scale, a service data transmission scenario in which, e.g., three service data units, a first service data unit SDU1, a second service data unit SDU2 and a third service data unit SDU3 are transmitted in accordance with the DECT radio interface protocol in a transmission session for transmitting service data in a DECT system, for example, between a DECT base station used as a transmitter or receiver and a DECT mobile part used as receiver or, transmitter.

For this transmission session, a predetermined number of protocol data units PDU, a first protocol data unit PDU1, a second protocol data unit PDU2, a third protocol data unit PDU3 and a fourth protocol data unit PDU4, which are adapted to the DECT radio interface protocol, especially to the DECT-related TDMA structure and to the various types of transmission for the service data transmission, are available which in each case essentially have a predefined basic structure and which are transmitted successively according to the DECT radio interface protocol. The basic structure of the protocol data unit header PDU1 through PDU4 in each case consists of an introductory part ELT, the so-called PDU header, and information field INF and a data field DAF which are arranged in the specified order in the protocol data units PDU1 through PDU4.

The information field INF contains a first information item IN1 and an extension configured as bit. The extension consists of a second information item 1N2 representing the, value "0" of the bit or of a third information item 1N3 representing the value "1" of the bit. In the text which follows, it will be explained what meaning the individual information items have.

In the specified transmission session, the first service data unit SDU1 is transmitted in the first protocol data unit PDU1, the second service data unit SDU2 is transmitted in the second protocol data unit PDU2 and the third service data unit SDU3 is transmitted in the third protocol data unit PDU3 and the fourth protocol data unit PDU4.

First Protocol Data Unit PDU1

The first service data unit SDU1 is packed into the data field DAF of the first protocol data unit PDU1 by the transmitting telecommunication device (transmitter) of the DECT system. The information field INF containing the information IN1 through IN3 is provided after the header part ELT, so that the receiving telecommunication device (receiver) can evaluate (detect) how large the length of the service data in the data field DAF of the first protocol data unit PDU1 is and whether the service data contained in the data field DAF represent a fragment of the first service data unit SDU1 or the non-end of the first service data unit SDU1 or the complete first service data unit SDU1 or the end of the first service data unit SDU1.

In the present case, the first information item IN1 specifies the length of the first service data unit SDU1 because the first service data unit SDU1 is smaller than the data field DAF of the first protocol data unit PDU1, whereas the second information item 1N2 specifies that the service data contained in the data field DAF represent the complete first service data unit SDU1 and that the end of the first service data unit SDU1 is present. The third information item IN3, which, in principle, is also possible as an extension, is shown in parenthesis in the present case in FIG. 1.

Since the first service data unit SDU1 is smaller than the data field DAF of the first protocol data unit PDU1 and, for the transmission of service data, the condition holds that only one service data unit SDU at least configured as a fragment can be transmitted in each protocol data unit PDU, the shaded area of the data field DAF in FIG. 1 remains unused for the transmission of service data. Ultimately, this has the result that the radio channel capacity available in accordance with the DECT standard is not optimally utilized. In other words, the bandwidth available in the DECT system for the telecommunication is poorly utilized.

In addition, this also results in a deterioration in the transmission rate in the transmission of service data.

This type of service data transmission also leads to the result that, when a service data unit is lost due to transmission disturbances on the radio link between the DECT base station and the DECT mobile part, the resultant greater transmission period cannot be made up or compensated for in the service data transmission (occurrence of lost time). This means that the quantity of service data to be transmitted in the telecommunication device (DECT base station and/or DECT mobile part) is maintained, i.e., not decreased. It is maintained; even though the quality of transmission of the transmission link between the telecommunication devices may only be temporarily poor, and that after another disturbance of the transmission link, an intervention into the data transfer is necessary because the quantity of service data becomes greater and greater.

So that this disadvantageous unwanted phenomenon will not occur in the first place, it is possible, according to the DECT standard, to provide a fixed spare capacity in the protocol data unit for transmitting service data which can be used in the case of transmission losses.

Second Protocol Data Unit PDU2

The second service data unit SDU2 is packed into the data field DAF of the second protocol data unit PDU2 by the transmitting telecommunication device (transmitter) of the DECT system. The formation field INF containing the information items IN1 through IN3 is provided after the header part ELT, so that the receiving telecommunication device (receiver) can evaluate (detect: 1) how large the length of the service data in the data field DAF of the second protocol data unit PDU2 is, and 2) whether the service data contained in the data field DAF represent a) a fragment of the second service data unit SDU2 b) the non-end of the second service data unit SDU2 the complete second service data unit SDU2 or the end of the second service data unit SDU2.

In the present case, the first information item IN1 specifies the service data length of the second service data unit SDU2 because the second service data unit SDU2 is exactly as large as the data field DAF of the second protocol data unit PDU2, whereas the second information item IN2 specifies that the service data contained in the data field DAF represent the complete second service data unit SDU2 and that the end of the second service data unit SDU2 is present. The third information item IN3, which, in principle, is also possible as extension, is represented in "0" in FIG. 1 in the present case.

Since the second service data unit SDU2 is exactly as large as the data field DAF of the second protocol data unit PDU2, the data field DAF of the second protocol data unit PDU2 is completely utilized for the transmission of service data in the present case. The phenomenon described above is in conjunction with the transmission of the first service data unit SDU1 will therefore not occur in the present case.

Third Protocol Data Unit PDU3 and Fourth Protocol Data Unit PDU4

The third service data unit SDU2 is packed into the data field DAF of the third protocol data unit PDU3 and the fourth protocol data unit PDU4 by the transmitting telecommunication device (transmitter) of the DECT system because the third service data unit SDU3 is larger than the data field DAF of the third protocol data unit PDU3. The third protocol data unit PDU3 is therefore completely filled with a corresponding first fragment FR1 of the third service data unit SDU3, whereas the remainder of the third service data unit SDU3, a second fragment FR2, is packed into the fourth protocol data unit PDU4. The information field INF containing the information items IN1 through IN3 is provided after the header part ELT, so that the receiving telecommunication device (receiver) can evaluate (detect): 1) how large the length of the service data in the data field DAF of the third protocol data unit PDU3 is, and 2) whether the service data contained in the data field DAF represent a) a fragment of the third service data unit SDU3 b) the non-end of the third service data unit SDU3 c) the complete third service data unit SDU3 or d) the end of the third service data unit SDU3.

In the present case, the first information item IN1 in the third protocol data unit PDU3 specifies the service data length of the first fragment, FR1 of the third service data unit SDU2, whereas the third information item IN3 specifies that the service data contained in the data field DAF represent the first fragment FR1 of the third service data unit SDU3 and that the non-end of the third service data unit SDU3 is present. The second information item IN2, which, in principle, is also possible as extension, is shown in parenthesis in FIG. 1 in the present case.

Since the first fragment FR1 of the third service data unit SDU3 is exactly as large as the data field DAF of the third protocol data unit PDU3, the data field DAF of the third protocol data unit PDU3 is completely utilized for the transmission of service data in the present case. The phenomenon described above in conjunction with the transmission of the first service data unit SDU1 will therefore not occur in the present case.

In the fourth protocol data unit PDU4, the first information item IN1 specifies the service data length of the second fragment FR2 of the third service data unit SDU3, whereas the second information item IN2 specifies that the service data contained in the data field DAF represent the second fragment FR2 of the third service data unit SDU3, that the second fragment FR2 represents the remainder of the third service data unit SDU3, and that the end of the third service data unit SDU3 is present. The third information item IN3 which, in principle, is also possible as extension, is shown in parenthesis in FIG. 1 in the present case.

The transmission session is ended at least temporarily with the transmission of the service data units SDU1 through SDU3. This means, e.g., for the downlink, that the DECT base station has no more service data to be transmitted by it to the DECT mobile part at the moment. The DECT mobile part is automatically informed of this non-transmission state (default state) by the following facts, first, according to the predetermined transmission protocol mentioned above—which says that in each protocol data unit, only a single service data unit (SDU) or possibly only a single fragment of a service data unit can be transmitted—only the second fragment FR2 of the third service data unit SDU3 is transmitted in the fourth protocol data unit SDU4, second, no further protocol data unit containing service data is sent to the DECT mobile part by the DECT base station. The above statements for the downlink can also be transferred to the case where the transmission session occurs on the uplink.

Since the second fragment FR2 of the third service data unit SDU3 is smaller than the data field DAF of the fourth protocol data unit PDU4 and, for the transmission of service data, the condition holds that only one service data unit SDU configured at least as a fragment can be transmitted in each protocol data unit PDU, the shaded area of the data field DAF in FIG. 1 remains unused for the transmission of service data. Ultimately, this has the result that the radio channel capacity available in accordance with the DECT standard is not optimally utilized. In other words, the band width available in the DECT system for telecommunication is poorly utilized.

In addition, this also results in a deterioration in the transmission rate in the transmission of service data.

This type of service data transmission also leads to the result that, when a service data unit is lost due to transmission disturbances on the radio link between the DECT base station and the DECT mobile part, the resultant greater transmission period cannot be made up or compensated for in the service data transmission (occurrence of lost time). This means that the quantity of service data to be transmitted in the telecommunication device (DECT base station and/or DECT mobile part) is maintained, i.e., not decreased, even though the quality of transmission of the transmission link between the telecommunication devices may only be temporarily poor, and that after another disturbance of the transmission link, an intervention into the data transfer is necessary because the quantity of service data becomes greater and greater.

European Patent EP 0 708 576 discloses a method for the transmission of payload data in telecommunication systems where the concern is how payload data blocks fashioned as CDMA data packets can be transmitted in ATM cells fashioned as data units. A distinction is made between a multiplex mode and a non-multiplex mode for this transmission. In the non-multiplex mode, a first control octet is contained in the information field of an ATM cell, whereas the first control octet and a second control octet are contained in the information field of the ATM cell in the multiplex mode. The first control octet contains an ACO field with one bit length and a PL field with six bit lengths and a parity field with one bit length. The ACO field indicates whether the first control octet is immediately followed by the second control octet or not. Regardless of whether the first control octet is followed by a second control octet, the PL field indicates the packet length of the CDMA data packet that immediately follows the control octet or the control octets. The parity field serves for error recognition.

SUMMARY OF THE INVENTION

The object of the invention consists in transmitting service data in telecommunication systems with wireless telecommunication based on a predefined radio interface protocol between telecommunication devices, especially voice data and/or packet data in DECT systems, with enhanced utilization of the bandwidth of the telecommunication system and at a greater transmission rate.

This object is achieved by a method for transmitting service data in telecommunication systems with wireless telecommunication based on a predefined radio interface protocol between telecommunication devices, comprising the steps of:

(a) transmitting the service data in protocol data units predefined by the radio interface protocol;

(b) transmitting a service data unit configured at least as a fragment in each protocol data unit independently of the size of the service data unit, which is configured at least as a fragment, in comparison with the size of a free part of the each protocol data unit which is in each case not yet occupied by service data;

(c) specifying, in each case, a service data length, which differs from the value "zero", of a respective the service data unit configured at least as a fragment, by a first information item allocated to the protocol data unit;

(d) specifying, in each case, an end of the respective service data unit by a second information item allocated to the protocol data unit;

(e) specifying, in each case, a non-end of the respective service data unit by a third information item allocated to the protocol data unit;

(f) specifying or allocating a fourth information item corresponding to the value "zero" of the service data length to the protocol data unit, together with the second information item in the protocol data unit when the transmission of service data is ended at least temporarily, especially within this protocol data unit.

The basic concept of the invention comprises transporting service data units to be transmitted, in the transmission of service data in telecommunication systems with wireless telecommunication based on a predefined radio interface protocol between telecommunication devices, especially voice data and/or packet data in DECT systems, cascaded (in the form of a cascade arrangement) by radio in protocol data units adapted to the radio interface protocol. The protocol data units in each case contain the same number of information fields, configured especially as length indicators for specifying the respective length of the service data, as there are service data units or, respectively, fragments of service data units contained in the respective protocol data unit. In addition, each information field contains an extension (a reference) in the form of a concatenated list whether further service data units or further fragments of service data units follow in the respective protocol data unit.

This procedure/method enables the transmission capacity in the telecommunication system or, the bandwith of the telecommunication system to be optimally utilized and time delays in the transmission of service data, eg., due to transmission disturbances or short-time overloading to be compensated with a higher data transmission rate than the possible one absent the inventive method.

Advantageous further developments of the invention include a method that further transmits service data in a protected manner. A step may be provided of arranging the first information item, the second information item and the third information item in front of the service data unit, which is at least configured as a fragment, in the respective protocol data unit. Finally, the second information item may consist of the value "0" of a bit and the third information item may consist of the value "1" of the bit. The data in the telecommunication systems may be voice or packet data in DECT systems.

An illustrative embodiment of the invention will be explained with reference to FIG. 2.

DESCRIPTION OF THE PREFERRED EMBODIMENTS

Figure 1:
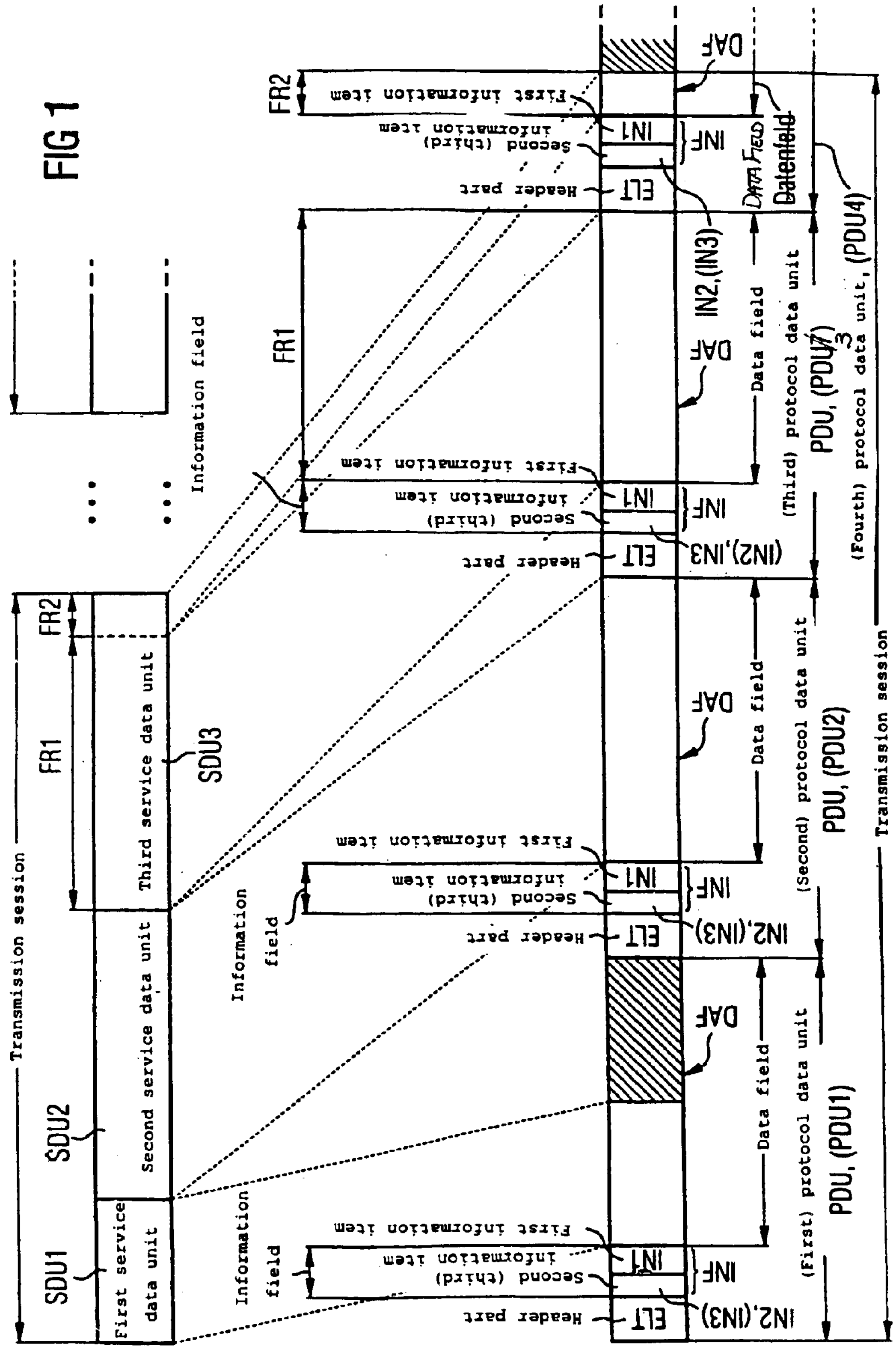
FIG. 1 is a data structure timing diagram showing a basic service data transmission scenario.
Figure 2:
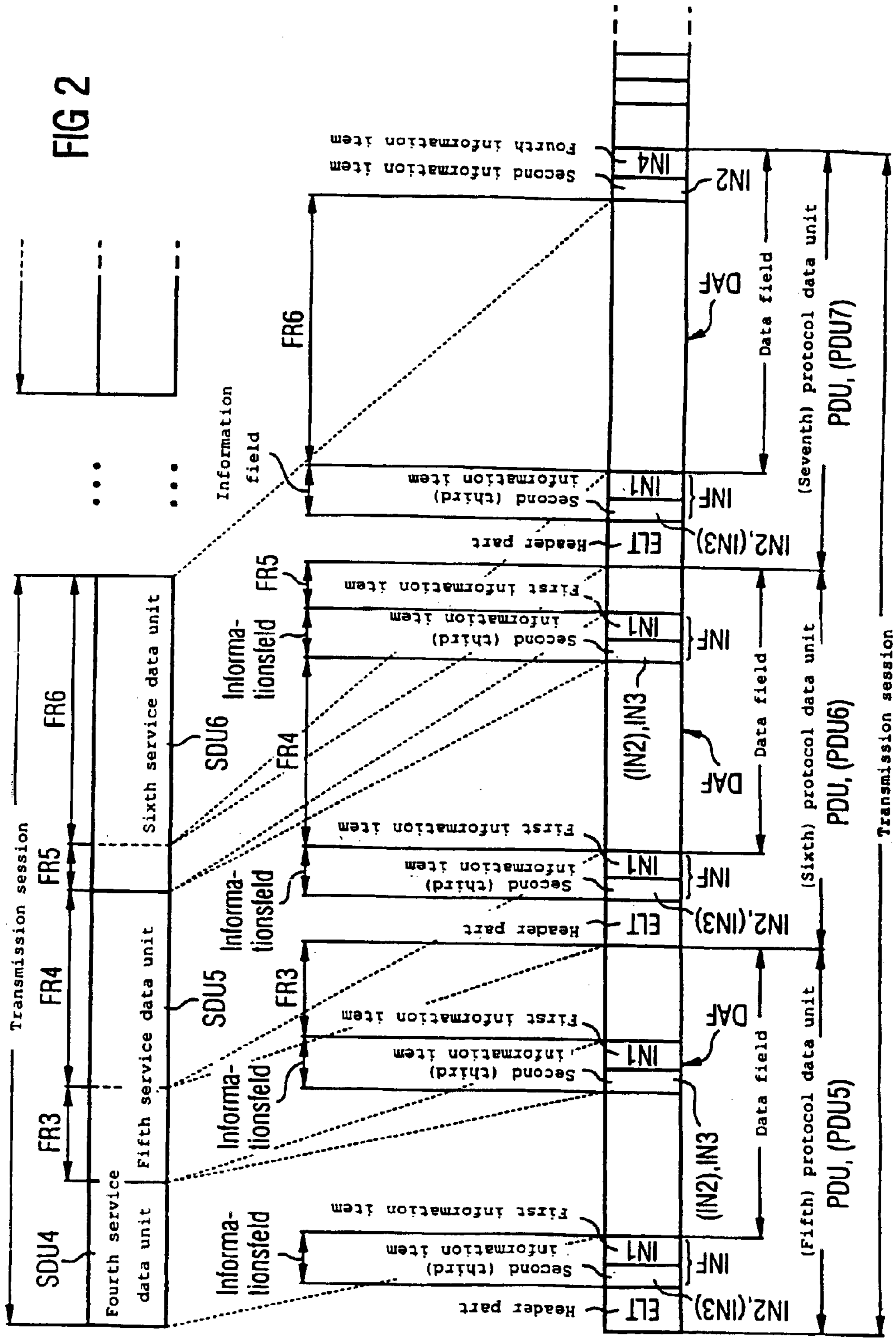
FIG. 2 is a data structure timing diagram showing a service data transmission scenario according to the invention.

Based on FIG. 1, FIG. 2 shows, by way of a basic not-to-scale representation, a service data transmission scenario in which, in a transmission session for transmitting service data in a DECT system (for example, between a DECT base station used as transmitter and, respectively, receiver and a DECT mobile part used as receiver and transmitter, e.g., three service data units, a fourth data service unit SDU4, a fifth service data unit SDU5 and a sixth service data unit SDU6 are transmitted in accordance with the DECT radio interface protocol.

For this transmission session, a predetermined number of protocol data units PDU, a fifth protocol data unit PDU5, a sixth protocol data unit PDU6 and a seventh protocol data unit PDU7, which are adapted to the DECT radio interface protocol, especially to the DECT-oriented TDMA structure and to the different alternatives are available, which, like the protocol data units PDU1 through PDU4 in FIG. 1, in each case essentially have a predetermined basic structure and which are transmitted successively in accordance with the DECT radio interface protocol. The basic structure of the protocol data units PDU5 through PDU7 in each case again consists of the header part ELT, the PDU header, the information field INF and the data field DAF which are arranged in the specified order in the protocol data units PDU5 through PDU7.

The information field INF again contains the first information item IN1 and the extension configured as a bit. The extension again consists either of the second information item 1N2 representing the value "0" of the bit or of the third information item IN3 representing the value "1" of the bit. The meaning of the individual information items is identical with the meaning of the information items in FIG. 1.

In the specified transmission session, the fourth service data unit SDU4 is transmitted in the fifth protocol data unit PDU5, the fifth service data unit SDU5 is transmitted in the fifth protocol data unit PDU5 and the sixth protocol data unit PDU6, and the sixth service data unit SDU6 is transmitted in the sixth protocol data unit PDU6 and the seventh protocol data unit PDU7.

Fifth Protocol Data Unit PDU5

The fourth service data unit SDU4 is packed into the data field DAF of the fifth protocol data unit PDU5 by the transmitting telecommunication device (transmitter) of the DECT system. The information field INF containing the information items IN1 through IN3 is provided after the header part ELT, so that the receiving telecommunication device (receiver) can evaluate (detect)-: 1) how large the service data length of the service data in the data field DAF of the fifth protocol data unit PDU5 is, and 2) whether the service data contained in the data field DAF represent a) a fragment of the fourth service data unit SDU4 b) the non-end of the fourth service data unit SDU4, c) the complete fourth service data unit SDU4 or, d) the end of the fourth service data unit SDU4.

In the present case, the first information item IN1 specifies the length of the fourth service data unit SDU4 because the fourth service data unit SDU4 is smaller than the data field DAF of the fifth protocol data unit PDU5, whereas the second information item 1N2 specifies that the service data contained in the data field DAF represent the complete fourth service data unit SDU4 and that the end of the fourth service data unit SDU4 is present. The third information item IN3, which, in principle, is also possible as an extension, is shown in parenthesis in FIG. 2 in the present case, as in FIG. 1.

Since the fourth service data unit SDU4 is smaller than the data field DAF of the fifth protocol data unit PDU5, a data segment—the shaded area as in FIG. 1—of the data field DAF is not needed for the transmission of the fourth service data unit SDU4. In distinction from FIG. 1, this segment is filled essentially with service data of the fifth service data unit SDU5 by the transmitting telecommunication device (transmitter) of the DECT system if service data are still be to transmitted. The restriction to "essentially" must be made because the information field INF with the information items IN1 through 1N3 is again needed with the transmission of service data of the fifth service data unit SDU5 in the fifth protocol data unit PDU5.

The information field is required so that the receiving telecommunication device (receiver) can evaluate (detect) whether the service data contained in the free data segment of the data field DAF in the fifth protocol data unit PDU5 represent: a) a fragment of the fifth service data unit SDU5, b) the non-end of the fifth service data unit SDU5 or the complete fifth service data unit SDU5 or d) the end of the fifth service data unit SDU5 and how large the service data length of the service data is in the free data segment of the data field DAF in the fifth protocol data unit PDU5.

The information field INF is preferably located following the fourth service data unit SDU4 and preceding the service data of the fifth service data unit SDU5 in the fifth protocol data unit PDU5.

Since the fifth service data unit SDU5 is larger than the free data segment of the data field DAF in the fifth protocol data unit PDU5, the fifth protocol data unit PDU5 is preferably completely filled with a corresponding third fragment FR3 of the fifth service data unit SDU5. In the information field INF following the fourth service data unit SDU4 in the fifth protocol data unit PDU5, the first information item IN1 in the fifth protocol data unit PDU5 specifies the service data length of the third fragment FR3 of the fifth service data unit SDU5, whereas the third information item IN3 specifies that the service data contained in the data segment of the data field DAF represent the third fragment FR3 of the fifth service data unit SDU5 and that the non-end of the fifth service data unit SDU5 is present. The second information item IN2, which, in principle, is also possible as extension, is represented in parenthesis FIG. 2 in the present case, as in FIG. 1.

Since the third fragment FR3 of the fifth service data unit SDU5 is preferably just as large as the (free) data segment of the data field DAF in the fifth protocol data unit PDU5, the data field DAF of the fifth protocol data unit PDU5 is completely utilized for transmitting the service data in the present case. The phenomenon described in conjunction with the transmission of the first service data unit SDU1 in FIG. 1 will not, therefore, occur in the present case.

Sixth Protocol Data Unit PDU6

The service data of the fifth service data unit SDU5, which did not fit into the fifth protocol data unit PDU5, are packed into the data field DAF of the sixth protocol data unit PDU6 by the transmitting telecommunication device (transmitter) of the DECT system. The information field INF containing the information items IN1 through IN3 is provided after the header part ELT, so that the receiving telecommunication device (receiver) can evaluate (detect): 1) how large the length of the service data is in the data field DAF of the sixth protocol data unit PDU5, and 2) whether the service data contained in the data field DAF represent a) a fragment of the fifth service data unit SDU5, b) the non-end of the fifth service data unit SDU5, c) the complete fifth service data unit SDU5, d) the end of the fifth service data unit SDU5.

In the present case, the first information item IN1 specifies the service data length of the fourth fragment FR4 because a fourth fragment FR4 of the fifth service data unit SDU5—which contains the service data of the fifth service data unit SDU5 which did not fit into the fifth protocol data unit PDU5—is smaller than the data field DAF of the sixth protocol data unit PDU6, whereas the second information item IN2 specifies that the service data contained in the data field DAF now represent the complete fifth service data unit SDU5 and that the end of the fifth service data unit SDU5 is present. The third information item IN3, which, in principle, is also possible as extension, is shown in parenthesis in FIG. 2 in the present case, as in FIG. 1.

Since the fourth fragment FR4 of the fifth service data unit SDU5 is smaller than the data field DAF of the sixth protocol data unit PDU6, a data segment—the shaded area as in FIG. 1—of the data field DAF is not needed for transmitting the fifth service data unit SDU5. In distinction from FIG. 1, this segment is filled essentially with service data of the sixth service data unit SDU6 by the transmitting telecommunication device (transmitter) of the DECT system if service data are still be to transmitted. The restriction to "essentially" must be made because the information field INF with the information items IN1 through IN3 is again needed with the transmission of service data of the sixth service data unit SDU6 in the sixth protocol data unit PDU6.

The information field is required so that the receiving telecommunication device (receiver) can evaluate (detect) whether the service data contained in the free data segment of the data field DAF in the sixth protocol data unit PDU6 represent a) a fragment of the sixth service data unit SDU6 b) the non-end of the sixth service data unit SDU6, c) the complete sixth service data unit SDUE or, d) the end of the sixth service data unit SDU6 and how large the service data length of the service data is in the free data segment of the data field DAF in the sixth protocol data unit PDU6.

The information field INF is preferably located following the fourth fragment FR4 of the fifth service data unit SDU5 and preceding the service data of the sixth service data unit SDU6 in the sixth protocol data unit PDU6.

Since the sixth service data unit SDU6 is larger than the free data segment of the data field DAF in the sixth protocol data unit PDU6, the sixth protocol data unit PDU6 is preferably completely filled with a corresponding fifth fragment FR5 of the sixth service data unit SDU6. In the information field INF following the fourth fragment FR4 of the fifth service data unit SDU5 in the sixth protocol data unit PDU6, the first information item IN1 in the sixth protocol data unit PDU6 specifies the service data length of the fifth fragment FR5 of the sixth service data unit SDU6, whereas the third information item IN3 specifies that the service data contained in the data segment of the data field DAF represent the fifth fragment FR5 of the sixth service data unit SDU6 and that the non-end of the sixth service data unit SDU6 is present. The second information item IN2, which, in principle, is also possible as extension, is represented in parenthesis in FIG. 2 in the present case, as in FIG. 1.

Since the fifth fragment FR5 of the sixth service data unit SDU6 is preferably just as large as the (free) data segment of the data field DAF in the sixth protocol data unit PDU6, the data field DAF of the sixth protocol data unit PDU6 is completely utilized for the transmission of service data in the present case. The phenomenon described in conjunction with the transmission of the first service data unit SDU1 in FIG. 1 will not, therefore, occur in the present case.

Seventh Protocol Data Unit PDU7

The service data of the sixth service data unit SDU6, which did not fit into the sixth protocol data unit PDU6, are packed into the data field DAF of the seventh protocol data unit PDU7 by the transmitting telecommunication device (transmitter) of the DECT system. The information field INF containing the information items IN1 through IN3 is preferably provided after the header part ELT, so that the receiving telecommunication device (receiver) can evaluate (detect): 1) how large the service data length of the service data is in the data field DAF of the seventh protocol data unit PDU7, and 2) whether the service data contained in the data field DAF represent a) a fragment of the sixth service data unit SDU6, b) the non-end of the sixth service data unit SDU6, c) the complete sixth service data unit SDU6 or, d) the end of the sixth service data unit In the present case, the first information item IN1 specifies the service data length of the sixth fragment FR6 because a sixth fragment FR6 of the sixth service data unit SDU6—which contains the service data of the sixth service data unit SDU6 which did not fit into the sixth protocol data unit PDU6—is smaller than the data field DAF of the seventh protocol data unit PDU7, whereas the second information item IN2 specifies that the service data contained in the data field DAF now represent the complete sixth service data unit SDU6 and that the end of the sixth service data unit SDU6 is present. The third information item IN3 which principle, is also possible as an extension, is shown in parenthesis in FIG. 2 in the present case, as in FIG. 1.

The transmission session is ended at least temporarily with the transmission of the service data units SDU4 through SDU6. This means, e.g., for the downlink, that the DECT base station, at the moment, has no further service data which it has to transmit to the DECT mobile part. In distinction from FIG. 1, the DECT mobile part must be separately informed of this non-transmission state (default state). A special information item specifying this default state is therefore preferably transmitted in the seventh protocol data unit PDU7 at the conclusion of the transmission session within the framework of the information field. The special information item preferably consists of the second information item IN2 and a fourth information item IN4. The fourth information item IN4 specifies that the service data length of the following service data unit has the length "0". This only means that no further service data are transmitted or/sent by the DECT base station to the DECT mobile part, at least temporarily. The above statements for the downlink can also be transferred to the case where the transmission session takes place on the uplink.

The above-described method are illustrative of the principles of the present invention. Numerous modifications and adaptions thereof will be readily apparent to those skilled in this art without departing from the spirit and scope of the present invention.

What is claimed is:

1. A method for transmitting service data in telecommunication systems with wireless telecommunication based on a predefined radio interface protocol between telecommunication devices, comprising the steps of:

transmitting protocol data, predefined by said radio interface protocol, wherein said protocol data comprises a plurality of protocol data units;

transmitting said service data within said protocol data, wherein the service data comprises a plurality of service data units, and wherein each service data unit corresponds at least in part to a free part of a respective protocol data unit;

allocating first information items to the protocol data units, wherein the first information items specify a respective service data length of corresponding service data units, said first information items each having a value that is different from "zero";

allocating second information items to the protocol data units, wherein the second information items specify a respective end of corresponding service data units;

allocating third information items to the protocol data units, wherein the third information items specify a respective non-end of corresponding service data units; and allocating a fourth information item, corresponding to the value "zero" of the service data length to a respective end protocol data unit, together with a respective second information item in said end protocol data unit when said transmission of service data is ended at least temporarily.

2. The method as claimed in claim 1, further comprising the step of transmitting said service data in a protected manner.

3. The method as claimed in claim 1, further comprising the steps of arranging a first information item in front of a respective service data unit, and arranging a second or third information item at the end of the respective service data unit.

4. The method as claimed in claim 1, wherein said second information item consists of the value "0" of a bit and said third information item consists of the value "1" of the bit.

5. The method as claimed in claim 1, wherein said data in telecommunication system is voice or packet data in DECT systems.

6. The method as claimed in claim 1, wherein said service data is ended at least temporarily within said protocol data unit.

* * * * *